(12) United States Patent
Young

(10) Patent No.: US 7,710,700 B2
(45) Date of Patent: May 4, 2010

(54) DC/DC CONVERTER WITH CURRENT LIMIT PROTECTION

(75) Inventor: Eric Young, Apex, NC (US)

(73) Assignee: Linear Technology Corporation, Milpitas, CA (US)

( * ) Notice: Subject to any disclaimer, the term of this patent is extended or adjusted under 35 U.S.C. 154(b) by 753 days.

(21) Appl. No.: 11/030,993

(22) Filed: Jan. 10, 2005

(65) Prior Publication Data

US 2006/0152874 A1    Jul. 13, 2006

(51) Int. Cl.
*H02H 7/00* (2006.01)
(52) U.S. Cl. ......................................... 361/93.1; 361/18
(58) Field of Classification Search .................... 361/31, 361/18, 93.1, 93.7–93.9
See application file for complete search history.

(56) References Cited

U.S. PATENT DOCUMENTS

| 5,028,861 | A | * | 7/1991 | Pace et al. | 323/222 |
| 5,612,610 | A | * | 3/1997 | Borghi et al. | 323/222 |
| 5,708,578 | A | * | 1/1998 | Stoddard et al. | 363/98 |
| 5,912,552 | A | * | 6/1999 | Tateishi | 323/285 |
| 6,657,417 | B1 | | 12/2003 | Hwang | |
| 7,068,023 | B2 | * | 6/2006 | Okada | 323/285 |
| 2004/0004470 | A1 | | 1/2004 | Yoshida et al. | |
| 2004/0263139 | A1 | | 12/2004 | Goto et al. | |
| 2006/0152874 | A1 | * | 7/2006 | Young | 361/93.1 |

FOREIGN PATENT DOCUMENTS

EP    1 229 634 A2    8/2002

OTHER PUBLICATIONS

National Semiconductor LM3557 Step-Up Converter for White LED Applications May 2000 pp. 1-11.*
European Search Report issued in European Patent Application No. 06250081.4-2207, mailed Oct. 27, 2009.
Mohan et al., "Power Electronics: Converter, Application and Design", 1989, pp. 81-90, Wiley & Sons, New York NY.
Mammano, B., "Current Sensing Solutions for Power Supply Designers", 1997 Unitrode Power Supply Design Seminar, pp. 1-1-1-34, Retrieved from the Internet: http://focus.ti.com/lit/ml/slup114.pdf.

* cited by examiner

*Primary Examiner*—Danny Nguyen
(74) *Attorney, Agent, or Firm*—McDermott Will & Emery LLP

(57) ABSTRACT

A converter coupled to a DC voltage input and connectable to a load, includes a signal responsive switch coupled between a first circuit point and a second circuit point. Current flow is directed by the switch, when in a closed state, to the second circuit point to bypass the load. A regulator circuit has an output coupled to a control input of the switch. The regulator circuit has a first input for receiving a sensed load parameter, a second input for receiving a sensed current level signal at the second circuit point when the switch is in its closed state, and a third input for receiving a sensed current level signal at the second circuit point, measured directly, when the switch is in an open state. A fixed minimum time is set for the switch to be in the open state. The third input inhibits re-closing of the switch, providing current limit protection for the switch.

21 Claims, 2 Drawing Sheets

DC/DC CONVERTER WITH CURRENT LIMIT PROTECTION

FIELD OF THE INVENTION

The present invention relates to direct current voltage regulators, more particularly to controlled limitation of current in DC/DC converters.

BACKGROUND

A conventional step-up DC/DC converter is illustrated in FIG. 1. Inductor 10 and diode 12 are connected in series between input ($V_{IN}$) and output ($V_{OUT}$) terminals. The input terminal is typically connected to a DC source, the controlled output connected to a load. Capacitor 14 is connected between the output terminal and ground. Signal responsive switch 16 and resistor 18 are connected in series between the inductor/diode junction and ground. The switch is represented by a transistor having a base connected to the output of latch 20 through switch driver circuit 22. A set terminal of the latch is connected to the output of AND gate 24. Delay circuit 26 has an input connected to the reset output of the latch and an output connected to a first input of the AND gate. A second input of the AND gate is connected to the output of comparator 28. A first input of the comparator receives a feedback signal related to an output parameter. The output parameter may be the voltage at the output, the feedback signal derived through a feedback circuit 30, the feedback appropriately scaled for comparison with a reference voltage 32 applied to a second input of the comparator. The reset terminal of the latch 20 is connected to the output of a second comparator 34. A first input of comparator 34 is connected to the junction between switch 16 and resistor 18. A second input of comparator 34 is connected to reference voltage circuit 36.

In operation, when switch 16 is in the on, or closed, state, current flows from source $V_{IN}$ through inductor 10 and resistor 18 to ground. Resistor 18 is a sensing element that provides an indication of the current level through the switch when the switch is closed. When the current through the switch increases to the threshold level of reference voltage 36, comparator 34 outputs a signal to reset the latch 20, thereby turning off switch 16. When the switch is turned off, energy stored in the inductor is transferred to the capacitor 14. Delay circuit 26 ensures that the high latch reset output signal is not applied to the input of AND gate 24 until a minimum time interval has occurred. Turn-on of switch 16 is thus delayed accordingly. Thereafter, the switch will again be turned on when the feedback level exceeds the reference input to comparator 28.

In the particular conventional circuit illustrated, commonly known as a boost regulator, regulated voltage output $V_{OUT}$ has a voltage level higher in magnitude than the voltage input $V_{IN}$ and of the same polarity. Known converters, for example, are Linear Technology LT3463 and LT3464 converters. With appropriate arrangement of inductor and capacitive elements, a boost regulator output voltage can be provided with a polarity opposite to that of the input voltage.

In the boost converter configuration, input current through inductor 10 is continuous, flowing either through switch 16 or diode 12. With a fixed minimum off-time of the switch 16, the current in the inductor can exceed the maximum current capability of the switch. Such situation can occur, for example, during a short circuit of the output to ground, during the charging of the capacitor 14 immediately after power is applied to the circuit, or any such charging of other circuit capacitors upon initial operation. The switch must turn on for a finite time to sample the inductor current before it can be determined by means of comparator 34 that the current exceeds the current limit threshold of reference 36. During the off-time of the switch, the inductor current does not ramp down as much as it increased during the short on-time because of the small reverse voltage across the inductor. Excessive switch current thus can occur and cause damage or destruction to the regulator as well as the switch.

Prior methods of dealing with the possibility of excessive inductor current have been known in general as frequency foldback provisions. These methods sense a low output feedback condition and accordingly increase an oscillator period in the control circuit of the switch, or increase the delay period, to lengthen the switch off-time by a fixed amount. Frequency foldback methods are disadvantageous in that the increased off-time may not be sufficient to prevent switch current runaway. Because of the uncertainty about external element values, the set off-time may be made too long, thereby unnecessarily ($V_{IN}$) constraining output current capability during normal operation.

The need thus exists for improved implementation for protection against overcurrent conditions in regulator circuits.

DISCLOSURE

The present invention fulfills the above-described needs of the prior art. In a converter coupled to a DC voltage input and connectable to a load, a signal responsive switch is coupled between a first circuit point and a second circuit point, preferably a ground power supply terminal. The load voltage may be of a polarity inverse to the polarity of the DC voltage input. Current flow is directed by the switch, when in a closed state, to the second circuit point to bypass the load. A regulator circuit has an output coupled to a control input of the switch. The regulator circuit has a first input for receiving a sensed load parameter signal, a second input for receiving a sensed current level signal at the second circuit point when the switch is in its closed state, and a third input for receiving a sensed current level signal at the second circuit point when the switch is in an open state. The sensed load parameter signal may be related to load voltage and obtained from a load voltage feedback circuit coupled to the first regulator circuit input. The third input of the regulator circuit preferably is coupled to a circuit element operable to conduct unidirectional current, such as a diode. The circuit element is connected in series with the ground input power supply terminal. Current through the diode and ground terminal is measured directly during the off-state of the switch to provide the third input to the regulator circuit. A latch circuit has an output coupled to the control input of the switch, a set input terminal coupled to the first input and the third input, and a reset input terminal coupled to the second input through a delay circuit.

In operation, the first circuit point is coupled by the switch to the second circuit point in response to the load parameter, for example load voltage, exceeding a predetermined level. The first circuit point is decoupled from the second circuit point in response to a current therebetween exceeding a current threshold level during the coupled state. Recoupling of the first circuit point to the second circuit point is delayed thereafter by at least a fixed timed period. During an excessive current condition at the second circuit point, recoupling is inhibited. The off-time of the switch thus is adjusted as much as needed to achieve a target inductor current before the switch is turned on. An oscillator period or fixed off-time thus can then be set to smaller values than in conventional regulators, thus realizing smaller external component sizes and higher power densities.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 1:
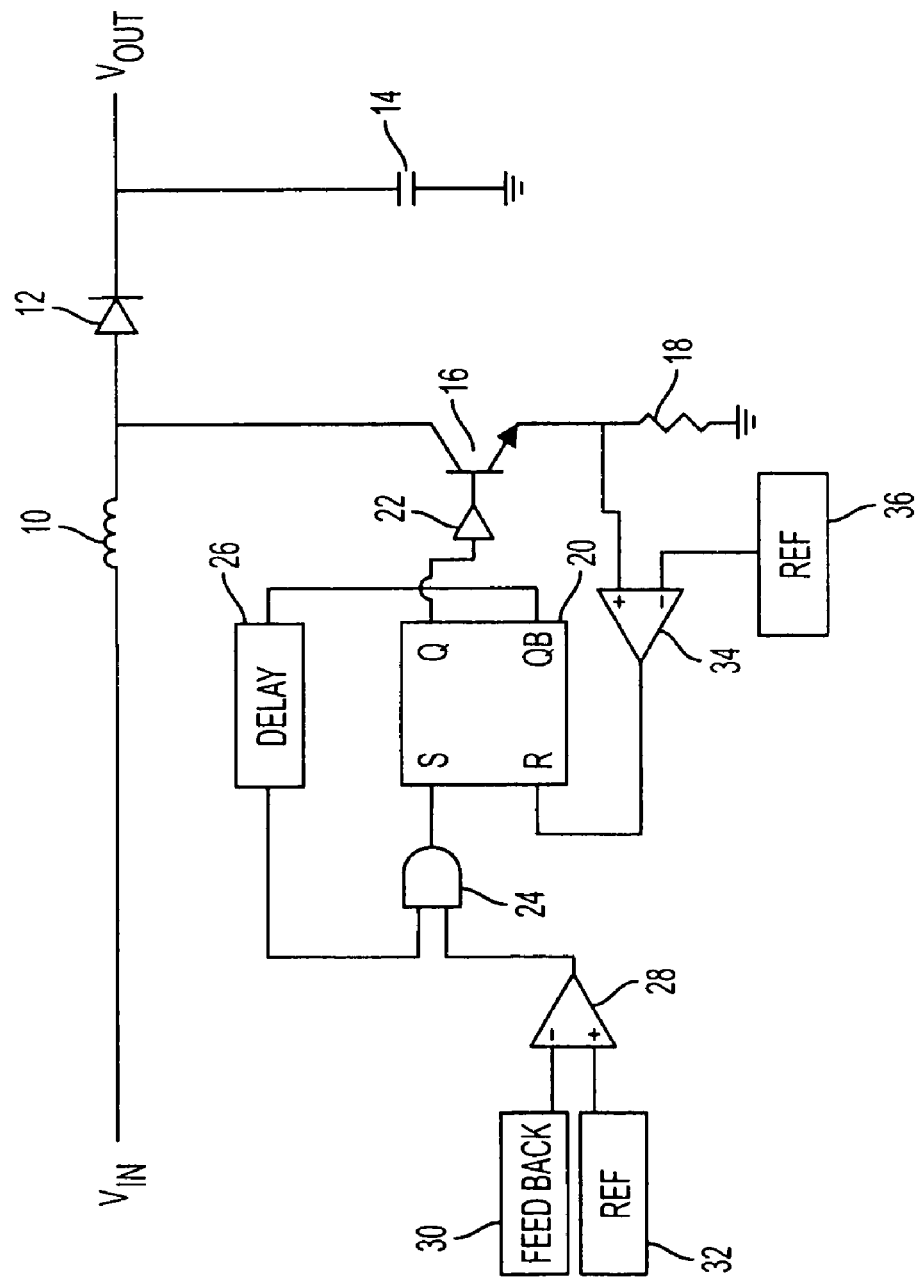
FIG. 1 is a diagram of a known step-up DC/DC converter.
Figure 2:
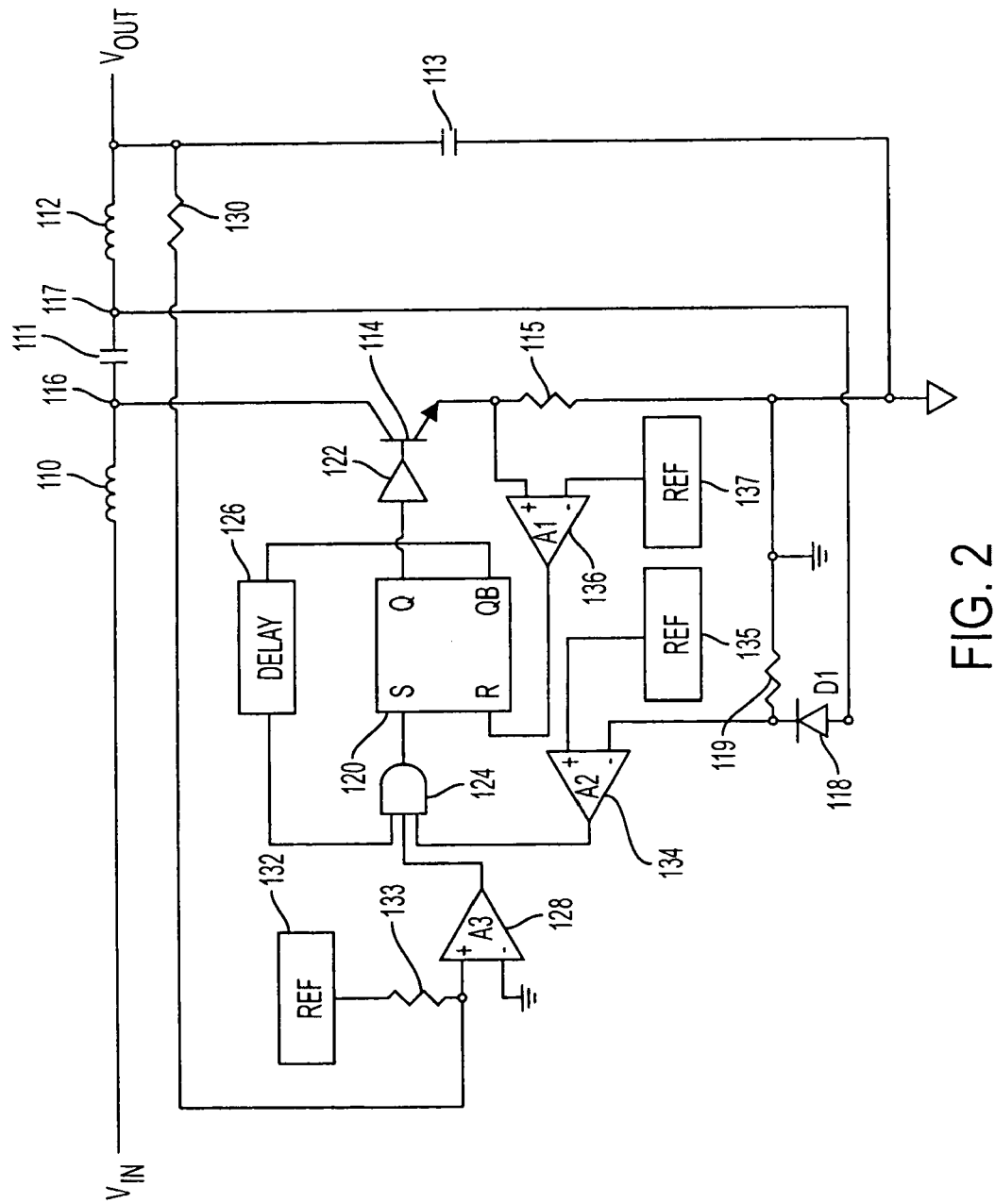
FIG. 2 is a diagram of a converter in accordance with the present invention.

The invention is exemplified by the diagram of FIG. 2, which illustrates an inverting DC/DC converter having a positive input voltage $V_{IN}$, for example five volts, and a negative output voltage $V_{OUT}$, for example negative eight volts. It should be understood that the invention is applicable to other boost converter circuits that can provide a regulated output voltage, at either polarity, of any particular desired level from any given DC source. Connected in series between input terminal $V_{IN}$ and output terminal $V_{OUT}$ are inductor 110, capacitor 111, and inductor 112. Capacitor 113 is connected between the output terminal and ground. Signal responsive switch 114, shown as a transistor, and resistor 115 are connected in series between the circuit point 116, which joins inductor 110 and capacitor 111, and ground. Capacitor 111 is connected to inductor 112 at circuit point 117. Connected in series between circuit point 117 and ground are schottky diode 118 and resistor 119. The base of transistor 114 is coupled to the output of latch 120 through switch driver circuit 122. A set terminal of the latch is connected to the output of AND gate 124. The reset output of the latch is connected to an input of AND gate 124 through delay circuit 126. A second input of the AND gate is connected to the output of comparator 128. Resistor 130 is connected between the $V_{OUT}$ terminal and a first input of comparator 128. The first comparator input of comparator 128 also is connected in series with reference voltage 132 and resistor 133. The voltage applied to the first comparator input thus represents a feedback signal related to the output voltage. The second input terminal of comparator 128 is connected to ground. A third input of AND gate 24 is connected to the output of comparator 134. A first input of comparator 134 is connected to reference voltage 135. The second input to comparator 134 is connected to diode 118 at its junction with resistor 119. The reset terminal of the latch 120 is connected to the output of comparator 136. A first input of comparator 136 is connected to the junction between switch 114 and resistor 115. A second input of comparator 136 is connected to reference voltage circuit 137.

During a switch cycle, switch 114 turns on and draws current through inductors 110 and 112. The current in the inductors ramps up until the voltage across resistor 115 exceeds reference voltage 137, causing comparator 136 to reset the latch and turn off the switch. When the switch turns off, inductor current that was flowing through the switch flows instead through diode 118 and resistor 119 to ground. The diode is forward biased and the inductor current ramps down. The switch cannot turn on again until a time period set by delay circuit 126 has elapsed. When the output of feedback comparator 128 is low, indicating that the output voltage is regulated to the desired level, the switch will not turn on. Comparator 128 produces a high output when the output voltage rises above the desired level. At that time, switch 114 will turn on if the other inputs to AND gate 124 are high. The level of the third input to the AND gate 124, the output of comparator 134, is dependent on monitoring the current through diode 118. Current flows through the diode only when the switch 114 is off. Switch turn-on is inhibited by comparator 134 until the diode current ramps below the value set by voltage reference 135 as measured by sensing resistor 119.

By way of example, reference voltage values for the circuit described above to provide a regulated output voltage of negative eight volts from a positive DC input of five volts may be 1.250 v for reference voltage 132 and 24 mv for reference voltages 135 and 137, with appropriate scaling of the other circuit elements. As the current value is measured directly, off-time of the switch is adjusted as much as needed to achieve a target inductor current before the switch is turned on. Damage to the switch or the regulator from excessive switch current thus can be avoided. The fixed minimum off-time, governed by the delay circuit 126, can be set to a smaller value as compared to conventional arrangements, resulting in smaller external component sizes and higher power densities.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, sensing of the diode current may be achieved using an on-chip resistor element and an integrated schottky diode or, alternatively, using external elements. The concepts expressed herein with respect to the illustrated inverting regulator circuit are equally applicable to other well known regulators configurations.

What is claimed is:

1. A converter circuit connectable to receive an input DC voltage at a first voltage level and provide an output DC voltage at a second voltage level to a load, comprising:
    a switch;
    a first current flow path when the switch is in an on-state, the first current flow path bypassing the load;
    a second current flow path when the switch is in an off-state, the second current flow path being electrically isolated from the input DC voltage, the second current flow path including a unidirectional current conducting device; and
    a control circuit coupled to the switch and configured to receive signals related respectively to a load parameter, current through the switch when the switch is in the on-state and current through the unidirectional current conducting device only when the switch is in the off-state, and in response, controlling the state of the switch.

2. A converter circuit as recited in claim 1, wherein the control circuit initiates the off-state switch condition when the switch current attains a prescribed level, and the control circuit comprises a delay circuit for maintaining the off-state of the switch for a fixed time period.

3. A converter circuit as recited in claim 2, wherein the control circuit initiates transition of the switch from off-state condition to the on-state condition after the fixed time period when the load parameter exceeds a threshold level.

4. A converter circuit as recited in claim 3, wherein said transition is inhibited when the current through the unidirectional current conducting device is at an excessive level.

5. A converter circuit as recited in claim 1, further comprising a load voltage feedback circuit coupled between the load and the control circuit, and wherein the load parameter is load voltage.

6. A converter circuit as recited in claim 1, wherein the output DC voltage is inverted in polarity from the polarity of the input DC voltage.

7. A converter circuit for receiving an input DC voltage to produce an output DC voltage supplied to a load, the output voltage having a polarity inverse with respect to a polarity of the input voltage, the circuit comprising:
   a signal responsive switch coupled between a first circuit point and a second circuit point;
   a unidirectional current conducting device coupled between a third circuit point and the second circuit point, and conducting current during a time period when the switch is in an open state; and
   a regulator circuit having an output coupled to a control input of the switch, the regulator circuit receiving at a first input thereof a sensed load parameter signal, receiving at a second input thereof a sensed current level signal at the second circuit point when the switch is in a closed state, and receiving at a third input thereof a sensed current level signal at the second circuit point only when the switch is in an open state; the second circuit point being coupled to a first terminal of an input voltage supply.

8. A converter circuit as recited in claim 7, further comprising a load voltage feedback circuit coupled to the first regulator circuit input and wherein the load parameter is load voltage.

9. A converter circuit as recited in claim 7, wherein the first and third circuit points are coupled with a capacitor.

10. A converter circuit as recited in claim 9, wherein current flowing into the first and third circuit points is coupled with a transformer.

11. A converter circuit as recited in claim 9, wherein the third input of the regulator circuit is coupled to a circuit element operable to conduct unidirectional current, the circuit element connected across the second and third circuit points.

12. A converter circuit as recited in claim 11, wherein the circuit element is a diode.

13. A converter circuit as recited in claim 11, wherein the regulator circuit comprises:
   a latch circuit having an output coupled to a control input of the signal responsive switch, a set input terminal coupled to the first input and the third input, and a reset input terminal coupled to the second input.

14. A converter circuit as recited in claim 13, further comprising a delay circuit coupled between a reset output terminal of the latch circuit and the set input terminal.

15. A method for controlling an inverting power regulator comprising the steps of:
   coupling a first circuit point to a second circuit point in response to a load parameter exceeding a predetermined level;
   decoupling the first circuit point from the second circuit point in response to a current therebetween exceeding a current threshold level during the coupled state;
   delaying recoupling of the first circuit point to the second circuit point by at least a fixed timed period after the decoupling step; and
   inhibiting the recoupling of the first and second circuit points during an excessive current condition existing between a third circuit point and the second circuit point during the decoupled state.

16. A method as recited in claim 15, wherein the load parameter is load voltage.

17. A method as recited in claim 16, wherein the second circuit point is a power supply terminal.

18. A method as recited in claim 17, wherein the excessive current condition is a current level at the second circuit point during the decoupled state.

19. A method as recited in claim 15, wherein the step of inhibiting recoupling comprises sensing current through a diode connected in series with the second circuit point.

20. A converter circuit as recited in claim 14, further comprising a gate having three inputs and an output, the output of the gate coupled to the set input of the latch circuit, a first input of the gate coupled to the first input, a second input of the gate coupled to the third input, and a third input of the gate coupled to the delay circuit.

21. A method as recited in claim 15, wherein a load voltage has a polarity inverse with respect to a polarity of an input voltage of the regulator.

* * * * *